US012566919B2

(12) United States Patent
Imam et al.

(10) Patent No.: US 12,566,919 B2
(45) Date of Patent: Mar. 3, 2026

(54) SYSTEMS AND METHODS FOR SIMPLIFYING STATUTORY REPORTING

(71) Applicant: SAP SE, Walldorf (DE)

(72) Inventors: Mohd Danish Imam, Bangalore (IN); Ajay Krishna Uniyal, Bangalore (IN)

(73) Assignee: SAP SE, Walldorf (DE)

( * ) Notice: Subject to any disclaimer, the term of this patent is extended or adjusted under 35 U.S.C. 154(b) by 172 days.

(21) Appl. No.: 18/506,045

(22) Filed: Nov. 9, 2023

(65) Prior Publication Data

US 2025/0156636 A1     May 15, 2025

(51) Int. Cl.
*G06F 40/279*        (2020.01)
*G06Q 40/12*        (2023.01)

(52) U.S. Cl.
CPC ......... *G06F 40/279* (2020.01); *G06Q 40/123* (2013.12)

(58) Field of Classification Search
CPC ....................................................... G10L 15/22
See application file for complete search history.

(56) References Cited

U.S. PATENT DOCUMENTS 8,813,178 B1 * 8/2014 Khanna ................... G06Q 10/10
                                                     726/8
11,798,542 B1 * 10/2023 Ryabov ................. G10L 15/197

11,836,468 B2 * 12/2023 Thiru .................. G06F 9/44505
11,978,437 B1 * 5/2024 Thattai .................. G10L 13/027
2011/0093471 A1 * 4/2011 Brockway ........... G06F 21/6209
                                                     707/E17.083
2013/0218753 A1 * 8/2013 Oikonomidis ....... G06Q 20/386
                                                     705/39
2019/0236126 A1 * 8/2019 Guzman .............. G06F 40/186
2020/0250810 A1 * 8/2020 Thompson ............ G06T 7/0004
2021/0019706 A1 * 1/2021 Bhalla ............. G06Q 10/06315
2021/0158366 A1 * 5/2021 Arnold .................. G06F 40/253
2022/0415316 A1 * 12/2022 Shaikh .................... H04L 65/80
2023/0267557 A1 * 8/2023 Uniyal .................. G06Q 40/12
                                                     705/30
2023/0281541 A1 * 9/2023 Wellmann .............. G06Q 40/12
2024/0257807 A1 * 8/2024 Ganmukhi .............. G10L 15/22
2024/0364689 A1 * 10/2024 Potlapally ............. H04L 63/107

* cited by examiner

*Primary Examiner* — Douglas Godbold
(74) *Attorney, Agent, or Firm* — Fountainhead Law Group, PC

(57)         ABSTRACT

Embodiments describe a technique for simplifying statutory reporting. A technique is described for recognizing entities in an audible command received from a business user. The audible command may be processed through a trained natural language model capable of generating entities from the audible command. The entities in turn may be used to generate instructions to be executed by a compliance reporting application. This technique may improve efficiencies by reducing amount of time the business user spends manually entering commands into the compliance reporting application.

20 Claims, 5 Drawing Sheets

300

310 receiving an audible command in a natural language

320 processing the audible command through a natural language model to generate a plurality of entities

330 generating a plurality of instructions from the plurality of entities

340 transmitting the plurality of instructions to a compliance reporting application for execution

SYSTEMS AND METHODS FOR SIMPLIFYING STATUTORY REPORTING

BACKGROUND

Unless otherwise indicated herein, the approaches described in this section are not prior art to the claims in this application and are not admitted to be prior art by inclusion in this section.

A multi-national corporation having operations in multiple countries needs to be compliant with the legal regulations of the countries that the corporation operates in. For instance, the multi-national corporation may need to submit various reports like value added tax, goods and services tax, withholding tax, SAFT, payments reporting, etc. The reports may also be in different formats like XML, PDF, TXT, JSON, CSV, XBRL etc. A business user can generate a legal compliance report for a particular country by navigating through multiple screens and performing many manual steps in a compliance reporting application. To generate a large number of reports for different countries can be a very time intensive process.

DETAILED DESCRIPTION

Described herein are methods and apparatuses to improve the process of generating compliance reports. In one embodiment, a user can instruct a system that includes a natural language processing model to generate a legal compliance report through an audible command. The system may process the audible command through a natural language processing model to generate a set of instructions and transmit the set of instructions to a compliance reporting application for execution. The compliance reporting application may be a legal compliance application or other compliance application. In another embodiment, a user can instruct the system to schedule the generation of a compliance report through an audible command. The system can process the audible command through a natural language processing model to generate a set of instructions and transmit the set of instructions to a compliance reporting application to schedule the generation of the compliance report at a specified date and/or time in the future. Advantages of generating a set of instructions that can be executed by a compliance reporting application now or at a future point in time include the reduction of time spent by a business user manually inputting commands and navigating through multiple screens to generate the compliance report in the compliance reporting application. It will be evident, however, to one skilled in the art that embodiments as defined by the claims may include some or all of the features in these examples alone or in combination with other features described below, and may further include modifications and equivalents of the features and concepts described herein. While a compliance report is described below, it is to be understood by those of skill in the art that the techniques described herein are applicable to generate any document or legal document that may be sent to government authorities for compliance verification.

Figure 1A:
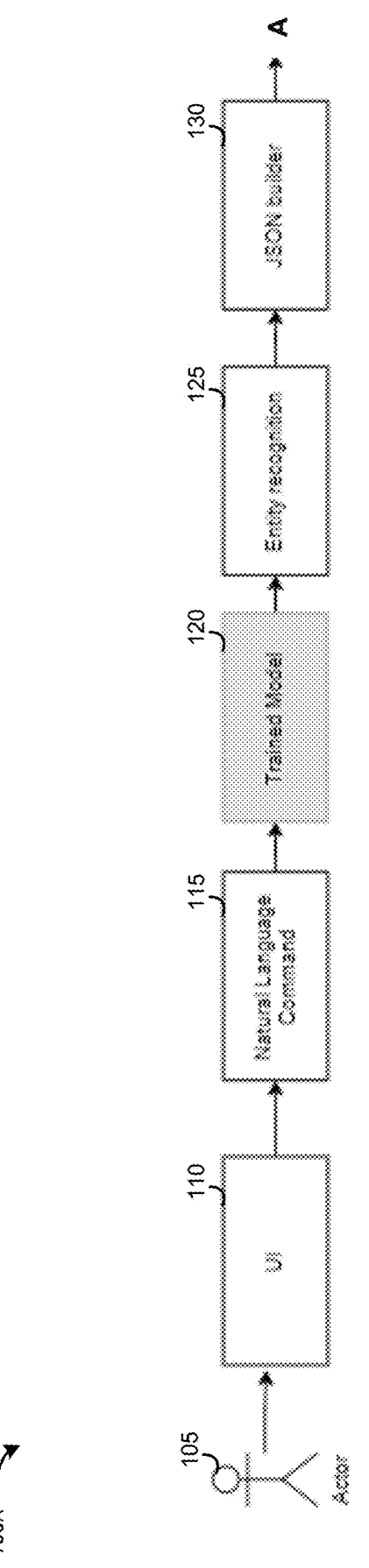
FIG. 1a illustrates a workflow for generating a set of instructions to be executed by a compliance reporting application according to some embodiments.

FIG. 1a illustrates a workflow for generating a set of instructions for a compliance reporting application according to some embodiments. In some embodiments, workflow 100A may be executed by a system having a trained natural language model that is configured to recognize entities in a natural language audible command. The identified entities can be converted into instructions which can be provided to a compliance reporting application to automate the process of generating a compliance report.

Workflow 100A begins with business user (or actor) 105 communicating with user interface 110 of the system. In one example, user interface 110 can include a microphone or other audio input device configured to receive an audible command or a voice command from business user 105. The communication with user interface 110 may be an audible input provided by business user 105, such as an audible command provided by the voice of business user 105. After the audible command is received by user interface 110, natural language command 115 may convert the audible command into a digital text representation of the audible command. The digital text representation of the audible command may be received by trained model 120 for processing. In some embodiments, trained model 120 is a trained natural language model capable of recognizing entities that are of interest for the compliance reporting application. While the example here illustrates the business user providing an audible command which is then converted into a text representation, in other examples the business user may also provide a text command using a chat interface.

Trained model 120 can perform entity recognition 125. Entity recognition 125 can include processing the digital text representation of the audible command to generate recognized entities. Recognized entities are keywords or phrases of interest that are related to commands that may be executed in the compliance reporting application. In some embodiments, each entity may include an entity type and an entity value. The pair (entity type and entity value) may together as a pair form an instruction. For example, a recognized entity may contain an entity type of "Country" and an entity value of "United States." Once the entities have been recognized, JSON builder 130 converts the recognized entities into a set of instructions. The set of instructions may be saved as a single JSON statement. While a JSON format is shown here as one example, other tools for generating or building object models could also be utilized to convert the recognized entities into object models in different formats which serve as instructions in the compliance reporting application. In some embodiments, the set of instructions can be transmitted to a compliance reporting application for execution. The set of instructions may be executed by the compliance reporting application to perform a task. The tasks can include data consistency checks, managing tax items to include in the report, generating a compliance report, emailing a compliance report, submitting a compliance report to a tax authority portal, and others. Generating a compliance report can include multiple steps so utilizing the set of instructions may provide advantages such as automating the process of generating the compliance report, thus reducing the amount of time spent by the business user to generate the compliance report.

Figure 1B:
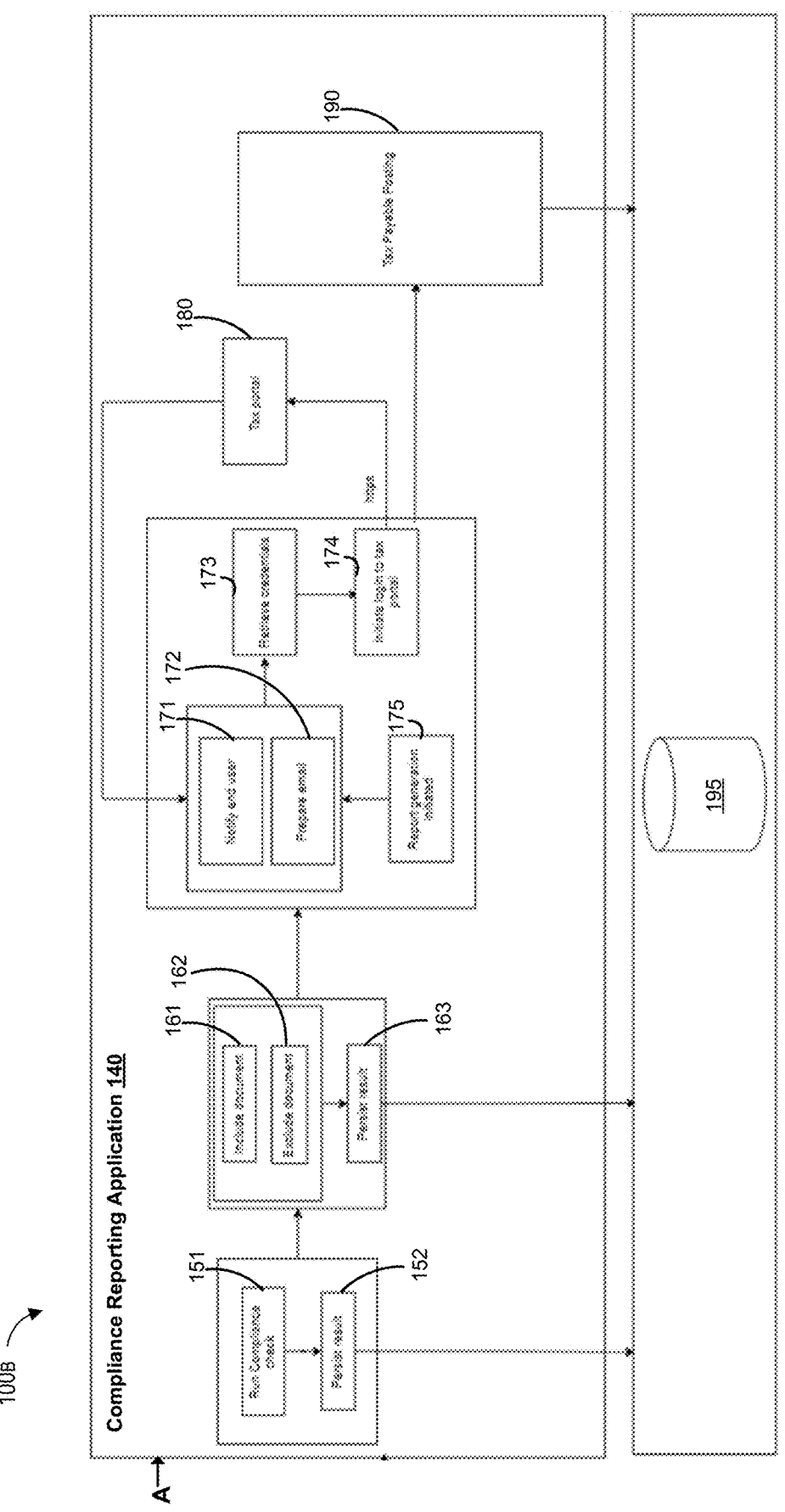
FIG. 1b illustrates a workflow for processing the set of instructions in a compliance reporting application according to some embodiments.

FIG. 1*b* illustrates a workflow for processing the set of instructions in a compliance reporting application according to some embodiments. As shown in workflow 100B, the set of instructions are received at "A" by compliance reporting application 140. Different tasks or actions can be performed depending on the instructions received. In some examples, each functionality can be performed be a separate application. In other examples, multiple functionalities are performed by a single application. In one embodiment, the task may be an end to end statutory reporting requirement in the compliance reporting application. Below are some example actions and tasks that can be performed by the compliance reporting application 140.

Data Consistency Check

An instruction may trigger the data consistency check functionality of the compliance reporting application 140. In one example, the data consistency check can include checking corporate tax compliance. The data consistency check can include running compliance check block 151 and persist result block 152. In one embodiment, the persist result block can document the result of the action performed to include or exclude documents. For example, the persist result block can allow the actions to be stored in a table that contains which documents have been moved, the documents original date, how many times a document has been moved, what is the current reporting date for the document, comments associated with movement of the document as entered by the business user, and other information related to the status of the document. In one embodiment, all this information is persisted and later on used to train the machine learning model. In essence, the persist result block ensures that all the actions that the user takes in relation to the modification of accounting documents is stored in a database table. The compliance check functionality can check the business data for rule violations. The rules for compliance checks can be defined either by the group or across the company. When requested, the rules for one or more compliance checks can be executed in order to identify any violations. If violations have been found in the business data, mitigation activities can be performed. The status of the mitigation activities can be tracked and the results can be persisted. In one example, compliance check is a pre activity and the results are input to the Manage Tax Items functionality.

Manage Tax Items

Once the data consistency has been completed, the business user may make adjustments in terms of which documents from the database should be considered when generating a compliance report. In one example, the documents can include accounting documents for a given reporting period. An instruction received by trigger a manage tax items application to manage the documents to include in the compliance report. Manage tax items application may include document block 161, exclude document block 162, and persist result block 163. Include document block 161 may maintain a list of documents to consider when generating the compliance report. Similarly, exclude document block 162 may maintain a list of documents to not consider when generating the compliance report. Once the documents to include and/or exclude have been defined, the results can be persisted by persist report block 163.

Report Generation and Submission

An instruction that triggers block 175 may generate a compliance report. In some embodiments, block 175 may generate the compliance report based on the set of documents to be included and/or excluded in the report that is managed by a set tax items application. Once the compliance report has been generated, block 171 may notify the business user that the compliance report has been generated and block 172 may prepare an email to send the compliance report to desired recipients. In other examples, the email contains a message notifying the recipient that the compliance report has been generated by the compliance report is not sent via email for security reasons. In some embodiments, the compliance report may be sent to the tax authorities. Block 173 may retrieve the credentials for logging into the tax portal and block 174 may initiate login to the tax portal. Once logged into the tax portal, the compliance report can be uploaded to the tax portal at block 180 or a payment can be made to the tax authority through tax payable posting block 190. Any changes to the underlying data and newly generated compliance reports can be stored in database 195.

In one embodiment the business user submits the generated legal report to the tax authorities' portal. This is a simple step when looked atomically but can take astronomically huge time when there are many countries involved and each country has multiple reporting requirements. The business user may be responsible to oblige with the legal reporting requirement of all the countries that they operate in. This manual process may have disadvantages, including:

1. Depending on the size of the business there are large number of reports to be generated.
2. The generated reports are manually submitted to the tax authorities as very few government portals allow for APIs to communicate with their server.
3. Once submitted the business user sets the submission status manually.
4. The mode of interaction for the business user is only through the clickable user interface Thus, it is advantageous to automate the process of submitting compliance reports to the tax authorities.

Figure 2:
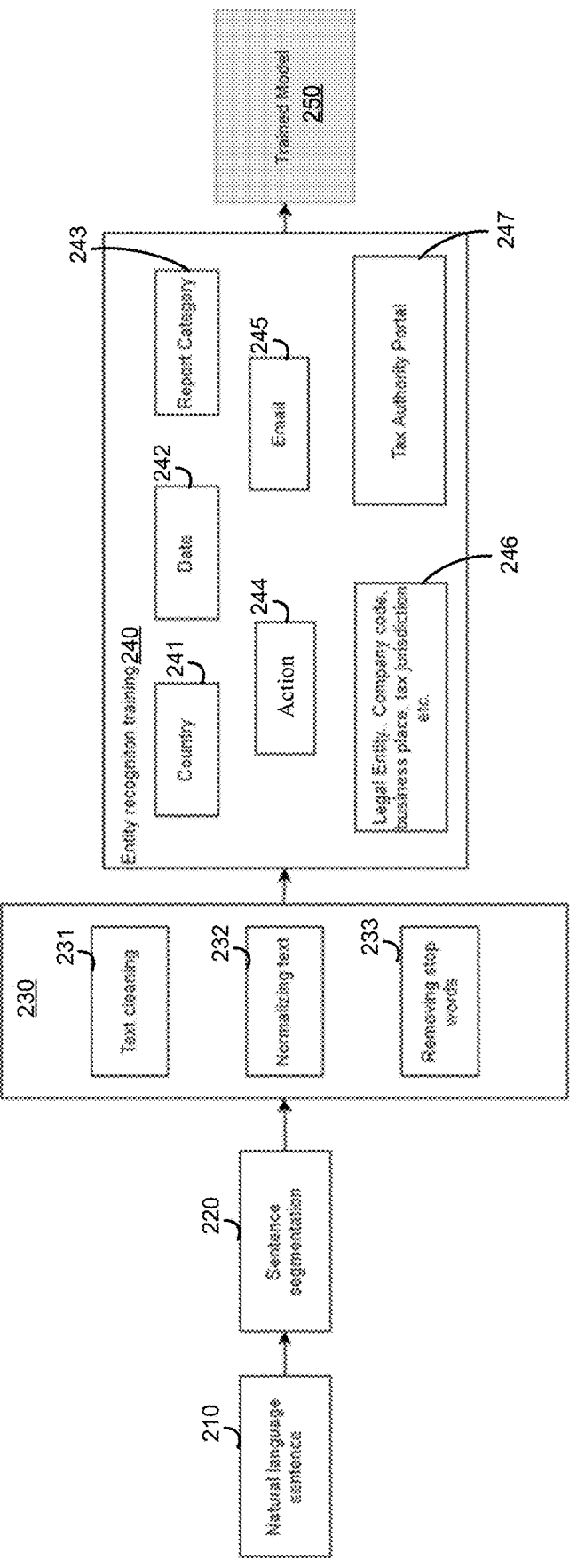
FIG. 2 illustrates a workflow for training an entity recognition model according to some embodiments.

FIG. 2 illustrates a workflow for training an entity recognition model according to some embodiments. As mentioned above in FIG. 1*a*, a trained model 120 may be utilized to process an audible command received from the business user. Processing may include identifying entities in the audible command. The entities may be related to instructions that may be executed within a compliance reporting application. In some examples, the entities may be processed to generate a set of instructions for automating the process of generating one or more compliance reports by the compliance reporting application. In other words, an entity may be represented as an instruction for a compliance reporting application.

Workflow 200 starts at block 210 which receives an audible command from the business user that is spoken in a natural language such as English, German, or Chinese. Once received, block 210 can convert the audible command into text in the form of natural language sentences. Workflow 200 can continue to block 220 where sentence segmentation is performed. Sentence segmentation defines the boundaries between sentences within the text. Block 230 may then be performed on the segmented sentences, which include sub-block 231 to clean the text. Text cleaning can include eliminating stop words, removing Unicode words, simplifying complex words, removing emojis, removing extra spaces, removing punctuations, and others. Block 230 can also include sub-block 232 to normalize the text. Text normalization can include reducing the complexity by reducing the text data into a predefined standard. By simplifying the text data, the efficiency of the training model can be improved. Block 230 can further include sub-block 233 to remove stop words in the text. Stop words are highly occurring words such as "a", "an", "is", "will", "would", etc. that do not as helpful in understanding the context of the text. As such, sub-block 233 may remove the stop words to simplify the text.

The text can be preprocessed through sentence segmentation as described in block 220 or sentence simplification by applying one or more techniques described in block 220. Once preprocessing has been completed, workflow 200 can continue to block 240 for entity recognition training. In entity recognition training, the training model is trained to identify one or more entities in the incoming text. In some embodiments, the entities that the model is trained to recognize may be based on the compliance reporting application. For example, the training model may be trained based on the available functionality of the compliance reporting application. For instance, the compliance reporting application may be configured to generate compliance reports for a list of available countries. As a result, the entity recognition training may train the model to recognize the names of the countries in that list. The model may be trained to recognize at least the following entities. It is however understood by those having skill in the art that the model may be trained to recognize entities beyond the list below:

1. Country
    2. Action (Run, submit, email . . . etc.)
    3. Country Code
    4. Date
    5. Report Category
    6. Report Entity
    7. Email
    8. Legal entity such as company code, business place, tax jurisdiction etc.
    9. Domain of tax authority portal Entity recognition training can include sub-block 241 to identify the entity country. In some embodiments, the country code can be derived once the country has been identified. Here are some examples of countries that the model is trained to identify. When any of these country names appear in a sentence, the sentence is identified as being related to the country entity.

Afghanistan
    Albania
    Algeria
    American Samoa
    Andorra
    Angola
    Anguilla
    Antigua and Barbuda
    Argentina
    Armenia
    Aruba
    Australia
    Austria
    Azerbaijan
    Bahamas (the)
    Bahrain
    Bangladesh . . . .

Entity recognition can further include sub-block 242 to identify the entity date. When a date is detected in a sentence, the sentence is identified as being related to the date entity. In one embodiment, the date may be a date range that the compliance report is reporting. For example, the date may be the month of March 2022 or the period between Jun. 1, 2023 and Aug. 1, 2023. Entity recognition can further include sub-block 243 to identify the report category. In one embodiment, sub-block 243 may be configured to recognize report categories based on the category of reports that can be generated by the compliance reporting application. Entity recognition can further include sub-block 244 to identify the desired action. When an action is detected in a sentence, the sentence is identified as being related to the action entity. In one embodiment, the list of actions can include:

Run
    Submit
    Email
    Execute
    Include
    Exclude
    Send . . . .

Entity recognition can further include sub-block 245 to identify the email address. When an email address is identified, the sentence containing the email address may be identified as being related to the email entity. In one embodiment, the email address may be the destination to send a given compliance report. Entity recognition can further include sub-block 246 to identify the legal entity, compliance code, business place, tax jurisdiction, or other information relevant to the generation of the compliance report. Lastly, entity recognition can further include sub-block 247 to identify the tax authority portal. In some embodiments, certain actions may depend on the identifying certain entities. For example, a sentence containing an action to email may depend on the sentence also containing an email address defining the recipient of the email, a report category defining the type of compliance report we wish to generate, a date defining the date range for which to generate the compliance report for, and/or a country to generate the compliance report for. If one or more of these dependent entities are missing in the sentence, a default entity value may be used. The default entity value may be predefined by entity recognition training block 240. Workflow 200 may include processing multiple sentences that contain the range of entities that trained model 250 should be able to detect. Once training has completed, trained model 250 is ready to recognize entities as shown in block 120 of FIG. 1*a*.

Below are some examples of entity recognition using a trained model and the resulting JSON statements as described in workflow 100A of FIG. 1*a*.

<div align="center">1<sup>st</sup> Example Input</div>

"Run the Australia TPAR For the month of March 2022."
These are the entities recognized from the example input sentence above.

| | Entity |
|---|---|
| Run | Action |
| Australia | Country |
| AU | Country Code |
| AU_TPAR_DCL | Report Category |
| March 2022 | Date |

Here is the example JSON statement generated from the entities recognized above.

```
{
..
...
...
    "action" : "run",
    "country": "australia",
    "reportcategory": "au_tpar_dcl",
```

-continued

```
    "countrycode" :"au",
    "reportingdatefrom" : "01-03-2022",
    "reportingdateto" :"31-03-2022",
    "email":"",
    "domain": ""
}
```

The JSON statement above may be transmitted to a compliance reporting application. Execution of the JSON statements by the compliance reporting application may result in the generation of a compliance report. In other embodiments, other data formats besides JSON can be utilized to generate statements that can be executed by the compliance reporting application. The data format may depend on the types of data formats that can be understood by the compliance reporting application.

2<sup>nd</sup> Example Input

"Email the Australia TPAR for the month of March 2022 to xyz@xyz.com."

These are the entities recognized from the example input above.

| | Entity |
|---|---|
| Email | Action |
| Australia | Country |
| AU | Country Code |
| AU_TPAR_DCL | Report Category |
| March 2022 | Date |
| xyz@xyz.com | Email |

Below is an example of the JSON statement generated from the entities recognized above. The JSON statement can be communicated with the API of the compliance reporting application.

```
{
    ..
    ...
    ...
    "action" : "email",
    "country": "australia",
    "reportcategory": "au_tpar_dcl",
    "countrycode" :"au",
    "reportingdatefrom" : "01-01-2022",
    "reportingdateto" :"31-03-2022"
    "email":" xyz@xyz.com ",
    "domain": ""
}
```

The compliance reporting application may receive the JSON statement and prepare an email and attach the compliance report with the email body to be sent to the email address specified. In some embodiments, the compliance reporting application may be unable to successfully execute the set of instructions provided in the JSON statement because a condition has not been met. For example, if the JSON statement is to email a compliance report but the compliance report has not been generated, then the email cannot be sent. In one embodiment, the system may determine that the audible command includes a condition that has not been met (e.g., emailing a compliance report that has not been generated) and automatically generate another set of instructions to rectify the condition (e.g., generating a JSON statement to generate the compliance report). This second set of instructions may also be transmitted to the compliance reporting application for execution prior to the first set of instructions. In other words, the compliance report may be generated before it is sent in an email. Here, the compliance report is the AU_TPAR_DCL report. In other embodiments, a sentence in the audible command may be missing required entities to generate a set of instructions that can be executed by the compliance reporting application. For example, the audible command may be to email but does not include an email address. In these instances, the system may respond to the business user by requesting more information such as the email address. In other examples, the system may notify the business user that the audible command cannot be fully executed rather than notifying the business user what information is needed to rectify the situation.

3<sup>rd</sup> Example Input

After the verification of the generated compliance report by the tax accountant or auditor, the business user may wish to submit the generated compliance report on the tax authority portal. This can also be achieved by giving a natural language command below.

"Submit the Australia TPAR for the month of March 2022 to https://xyz.com"

These are the entities recognized from the example input sentence above.

| | Entity |
|---|---|
| Submit | Action |
| Australia | Country |
| AU | Country Code |
| AU_TPAR_DCL | Report Category |
| March 2022 | Date |
| https://xyz.com | Domain |

Below is an example of the JSON statement generated from the entities recognized above. The JSON statement can be communicated with the API of the compliance reporting application.

```
{
    ..
    ...
    ...
    "action": "submit",
    "country": "australia",
    "reportcategory": "au_tpar_dcl",
    "countrycode": "au",
    "reportingdatefrom": "01-01-2022",
    "reportingdateto" :"31-03-2022"
    "email":"",
    "domain": "https://xyz.com"
}
```

The compliance reporting application may receive the JSON statement above and retrieve credentials from within the compliance reporting application along with the compliance report AU_TPAR_DCL and submit the compliance report to the tax authorities' portal. After the submission of the generated compliance report, the compliance reporting application may send an email to the business user about the status of the submission. In other examples, the business user may be notified of the status of submission through the UI along with the submission token with which it was submitted at the tax authority portal.

4<sup>th</sup> Example Input

In some examples, multiple actions can be performed in a single sentence as shown in the example below.

"Execute and Submit the Australia TPAR for the month of March 2022 to https://xyz.com"

The example input sentence above would initiate the entire end to end compliance process from data consistency check to submission through the tax authority portal.

In some embodiments, the system having a trained language model can further include a scheduler to schedule process execution. The business user may use an audible command to set up the system with the scheduler which is a one-time activity. The scheduler may generate a set of instructions which are in turn transmitted to the compliance reporting application. The compliance reporting application may execute the set of instructions to schedule activity on a predefined schedule. For example, an audible command may be processed by the trained language model and identified as a command to schedule an action such as the submission of a compliance report to a tax authority portal at a given time and date. The scheduled activity could also be recurring such as once a week, twice a month, or once a month, for example. If scheduling is an available feature, then the trained language model would be trained to recognize entities related to scheduling. Entities related to scheduling may include frequency (daily, weekly, monthly, annually, etc), date when the report should be prepared, selection values for report execution, tax authority domain information, and email address to receive notifications in case of success or errors.

In some embodiments, the designed system may also maintain the log of the execution at each step which the business user can refer to for auditing. The designed system has advantages including significantly reduces the manual effort needed to follow the entire compliance process right from data consistency check to tax payable posting.

In some embodiments, the designed system may be configured to integrate with various third party programs, such as Microsoft Teams, Amazon Alexa, Skype, and SAP Copilot, and SAP Joule. Integrating with third party programs may provide advantages such as being able to issue audible commands through the third party program. In one embodiment, the designed system may integrate with a business communication platform. The business user may enter a command (either type in a command or provide a command through voice where the business communication platform would perform speech to text translation) such as "Compliance Reporting Application—run the Australia TPAR for the month of March 2022." The designed system may be configured to scan user commands for entities and automatically generate a set of instructions based on the detected entities. In one example, the set of instructions may be in the format of a JSON statement. This would allow the set of instructions to be generated based on input received in the business communication platform and therefore reducing the need of the business user to navigate between different tools. In another embodiment, the designed system may be integrated with a digital assistant such as Amazon Alexa or SAP CoPilot. The digital assistant would be able to perform speech to text conversion for an audible command received from the business user. The designed system may in turn process the text for entities and convert the entities into a set of instructions, potentially in a format such as the JSON statement. Integrating with a digital assistant would allow the ability to generate compliance reports through the digital assistant, thus reducing the need to navigate between different applications and tools.

Figure 3:
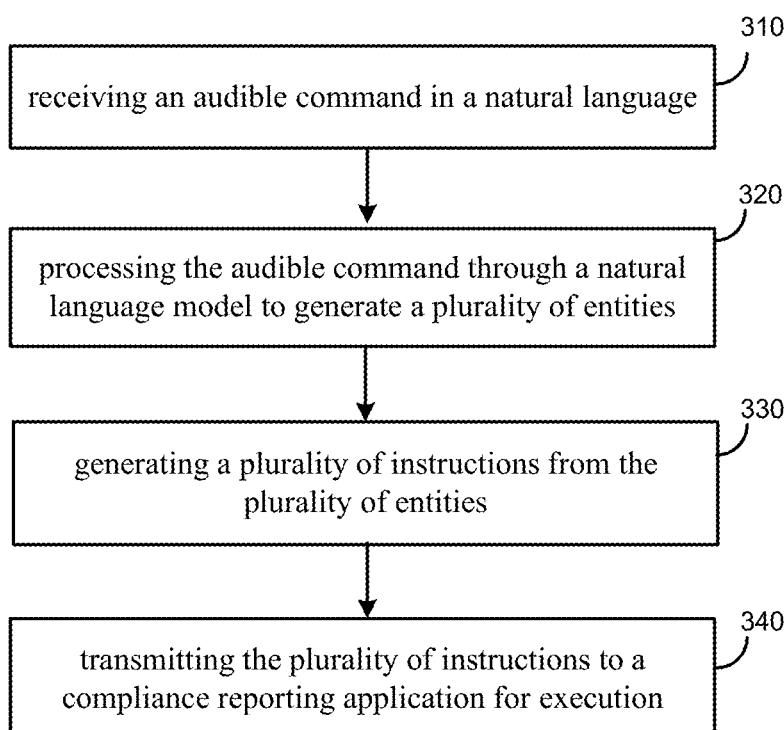
FIG. 3 illustrates a method for processing an audible command according to some embodiments.

FIG. 3 illustrates a method for processing an audible command according to some embodiments. Method 300 begins by receiving an audible command in a natural language at step 310. The audible command may be a voice command received from a business user in a natural language such as English, German, or Spanish. Method 300 can continue by processing the audible command through a natural language model to generate a plurality of entities at step 320. In one embodiment, the natural language model is trained to recognize keywords or phrases in the audible command that are related to instructions capable of being understood by a compliance reporting application and generate entities from those keywords or phrases. Each entity may have an entity type and an entity value. Entity types define the type of entity. For example, types of entities can include country, action, country code, date, email, report category, legal entity, and domain of tax portal to name a few. Entity value would be the value associated with the entity type. In some embodiments, the possible entities to be generated may depend on the list of instructions that can be executed by the compliance reporting application. As the compliance reporting application is updated, so can be the list of possible entities to be generated. In some embodiments, each entity is based on at least one keyword or phrase of interest in the audible command.

Method 300 continues by generating a plurality of instructions from the plurality of entities at step 330. Each entity may be translated into a JSON instruction and the combination of all JSON instructions translated from the plurality of entities may form a JSON statement. Method 300 may continue by transmitting the plurality of instruction to a compliance reporting application for execution. In some examples, the plurality of instructions may be transmitted as a JSON statement. Example JSON statements are shown above.

Figure 4:
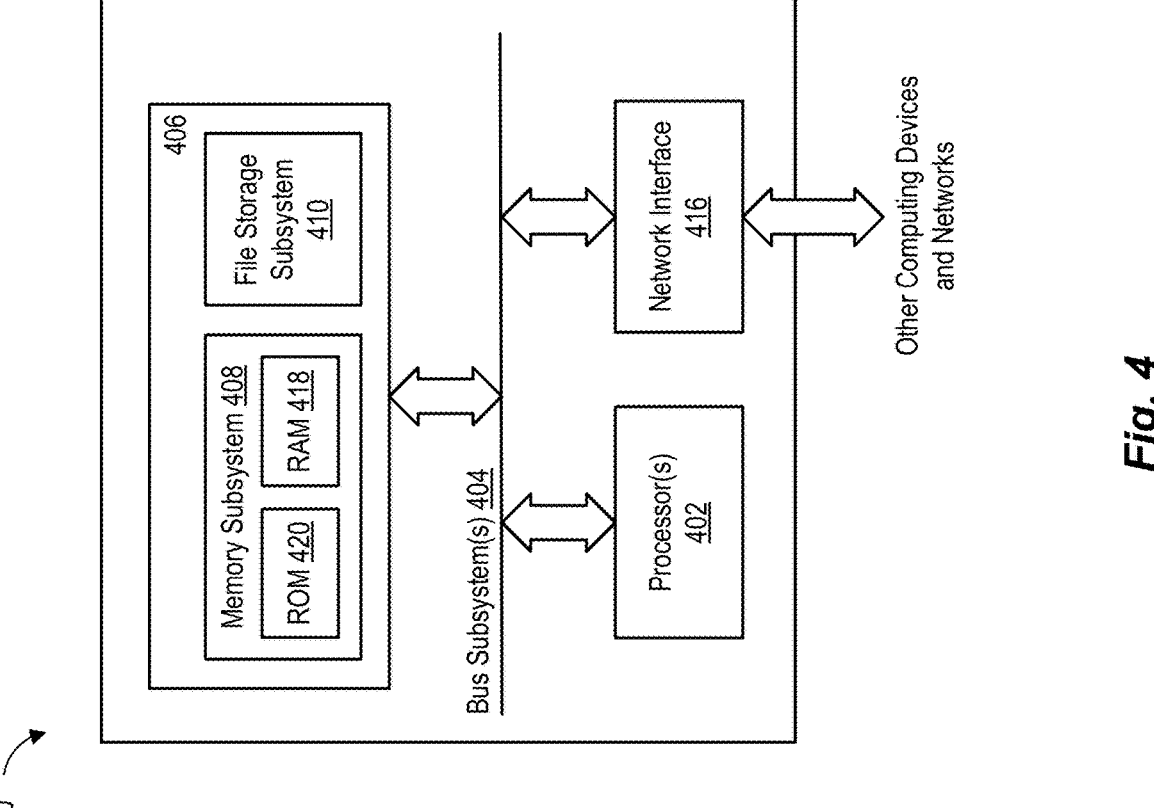
FIG. 4 depicts a simplified block diagram of an example computer system 400, which can be used to implement some of the techniques described in the foregoing disclosure.

FIG. 4 depicts a simplified block diagram of an example computer system 400, which can be used to implement some of the techniques described in the foregoing disclosure. As shown in FIG. 4, system 400 includes one or more processors 402 that communicate with several devices via one or more bus subsystems 404. These devices may include a storage subsystem 406 (e.g., comprising a memory subsystem 408 and a file storage subsystem 410) and a network interface subsystem 416. Some systems may further include user interface input devices and/or user interface output devices (not shown).

Bus subsystem 404 can provide a mechanism for letting the various components and subsystems of system 400 communicate with each other as intended. Although bus subsystem 404 is shown schematically as a single bus, alternative embodiments of the bus subsystem can utilize multiple busses.

Network interface subsystem 416 can serve as an interface for communicating data between system 400 and other computer systems or networks. Embodiments of network interface subsystem 416 can include, e.g., Ethernet, a Wi-Fi and/or cellular adapter, a modem (telephone, satellite, cable, etc.), and/or the like.

Storage subsystem 406 includes a memory subsystem 408 and a file/disk storage subsystem 410. Subsystems 408 and 410 as well as other memories described herein are examples of non-transitory computer-readable storage media that can store executable program code and/or data that provide the functionality of embodiments of the present disclosure.

Memory subsystem 408 comprise one or more memories including a main random access memory (RAM) 418 for storage of instructions and data during program execution and a read-only memory (ROM) 420 in which fixed instructions are stored. File storage subsystem 410 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that system 400 is illustrative and many other configurations having more or fewer components than system 400 are possible.

The above description illustrates various embodiments of the present invention along with examples of how aspects of the present invention may be implemented. The above examples and embodiments should not be deemed to be the only embodiments and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

FURTHER EXAMPLES

Each of the following non-limiting features in the following examples may stand on its own or may be combined in various permutations or combinations with one or more of the other features in the examples below. In various embodiments, the present disclosure may be implemented as a processor or method.

In some embodiments the present disclosure includes a method comprising receiving an audible command in a natural language, processing the audible command through a natural language processing model to generate a plurality of entities wherein each entity in the plurality of entities is based on at least one keyword of interest in the audible command, generating a plurality of instructions from the plurality of entities, and transmitting the plurality of instructions to a compliance reporting application for execution.

In one embodiment, each entity in the plurality of entities includes an entity type and an entity value, the entity type and entity value pair forming an instruction.

In one embodiment, the plurality of entities are saved as a JSON statement.

In one embodiment, the entity type includes country, action, country code, date, report category, report entity, email, legal entity, and domain of tax portal.

In one embodiment, the plurality of instructions perform a task in the compliance reporting application.

In one embodiment, the task is an end to end statutory reporting requirement in the compliance reporting application.

In one embodiment, the method further comprises determining that the plurality of instructions cannot be executed by the legal compliance application due to a condition, generating a second plurality of instructions to rectify the condition, and transmitting the second plurality of instructions to the legal compliance application for execution prior to the execution of the plurality of instructions.

In some embodiments, the present disclosure includes a system for processing an audible command, comprising one or more processors, a non-transitory computer-readable medium storing a program executable by the one or more processors, the program comprising sets of instructions for receiving an audible command in a natural language, processing the audible command through a natural language processing model to generate a plurality of entities wherein each entity in the plurality of entities is based on at least one keyword of interest in the audible command, generating a plurality of instructions from the plurality of entities, and transmitting the plurality of instructions to a compliance reporting application for execution.

In some embodiments, the present disclosure includes a non-transitory computer-readable medium storing a program executable by one or more processors, the program comprising sets of instructions for: receiving an audible command in a natural language, processing the audible command through a natural language processing model to generate a plurality of entities wherein each entity in the plurality of entities is based on at least one keyword of interest in the audible command, generating a plurality of instructions from the plurality of entities, and transmitting the plurality of instructions to a compliance reporting application for execution.

What is claimed is:

1. A method comprising:

receiving an audible command in a natural language;

processing the audible command through a natural language processing model to generate a plurality of entities wherein each entity in the plurality of entities is based on at least one keyword of interest in the audible command;

generating a plurality of machine-readable instructions from the plurality of entities, wherein the plurality of machine-readable instructions comprise entities specifying at least one action, at least one document, at least one date, and at least one target URL, wherein the plurality of machine-readable instructions perform the at least one action on the at least one document on the at least one date in accordance with the at least one target URL; and transmitting the plurality of machine-readable instructions to a compliance reporting application for execution.

2. The method as in claim 1, wherein each entity in the plurality of entities includes an entity type and an entity value, the entity type and entity value pair forming an instruction.

3. A method as in claim 2, wherein the plurality of entities are saved as a JSON statement.

4. A method as in claim 2, wherein the entity type includes one of: country, action, country code, date, report category, report entity, email, legal entity, and domain of tax portal.

5. A method as in claim 1, wherein the plurality of machine-readable instructions perform a task in the compliance reporting application.

6. A method as in claim 5, wherein the task is an end to end statutory reporting requirement in the compliance reporting application.

7. A method as in claim 1, further comprising:

determining that the plurality of machine-readable instructions cannot be executed by the legal compliance application due to a condition;

generating a second plurality of machine-readable instructions to rectify the condition; and transmitting the second plurality of machine-readable instructions to the compliance reporting application for execution prior to the execution of the plurality of machine-readable instructions.

8. A system for processing an audible command, comprising:

one or more processors;

a non-transitory computer-readable medium storing a program executable by the one or more processors, the program comprising sets of instructions for:

receiving an audible command in a natural language;

processing the audible command through a natural language processing model to generate a plurality of entities wherein each entity in the plurality of entities is based on at least one keyword of interest in the audible command;

generating a plurality of machine-readable instructions from the plurality of entities, wherein the plurality of machine-readable instructions comprise entities specifying at least one action, at least one document, at least one date, and at least one target URL, wherein the plurality of machine-readable instructions perform the at least one action on the at least one document on the at least one date in accordance with the at least one target URL; and transmitting the plurality of machine-readable instructions to a compliance reporting application for execution.

9. The system of claim 8, wherein each entity in the plurality of entities includes an entity type and an entity value, the entity type and entity value pair forming an instruction.

10. The system of claim 9, wherein the plurality of entities are saved as a JSON statement.

11. The system of claim 9, wherein the entity type includes country, action, country code, date, report category, report entity, email, legal entity, and domain of tax portal.

12. The system of claim 8, wherein the plurality of machine-readable instructions perform a task in the compliance reporting application.

13. The system of claim 12, wherein the task is an end to end statutory reporting requirement in the compliance reporting application.

14. The system of claim 8, wherein the program further comprises sets of instructions for:

determining that the plurality of machine-readable instructions cannot be executed by the legal compliance application due to a condition;

generating a second plurality of machine-readable instructions to rectify the condition; and transmitting the second plurality of machine-readable instructions to the compliance reporting application for execution prior to the execution of the plurality of instructions.

15. A non-transitory computer-readable medium storing a program executable by one or more processors, the program comprising sets of instructions for:

receiving an audible command in a natural language;

processing the audible command through a natural language processing model to generate a plurality of entities wherein each entity in the plurality of entities is based on at least one keyword of interest in the audible command;

generating a plurality of computer-readable instructions from the plurality of entities, wherein the plurality of computer-readable instructions comprise entities specifying at least one action, at least one document, at least one date, and at least one target URL, wherein the plurality of computer-readable instructions perform the at least one action on the at least one document on the at least one date in accordance with the at least one target URL; and transmitting the plurality of computer-readable instructions to a compliance reporting application for execution.

16. The non-transitory computer-readable medium of claim 15, wherein each entity in the plurality of entities includes an entity type and an entity value, the entity type and entity value pair forming an instruction.

17. The non-transitory computer-readable medium of claim 16, wherein the plurality of entities are saved as a JSON statement.

18. The non-transitory computer-readable medium of claim 16, wherein the entity type includes country, action, country code, date, report category, report entity, email, legal entity, and domain of tax portal.

19. The non-transitory computer-readable medium of claim 15, wherein the plurality of machine-readable instructions perform a task in the compliance reporting application.

20. The non-transitory computer-readable medium of claim 15, wherein the program further comprises sets of instructions for:

determining that the plurality of machine-readable instructions cannot be executed by the legal compliance application due to a condition;

generating a second plurality of machine-readable instructions to rectify the condition; and transmitting the second plurality of machine-readable instructions to the compliance reporting application for execution prior to the execution of the plurality of machine-readable instructions.

* * * * *